(12) United States Patent
Bienas et al.

(10) Patent No.: US 11,356,170 B2
(45) Date of Patent: Jun. 7, 2022

(54) REDUCTION OF INTERFERENCE CAUSED BY AERIAL VEHICLES

(71) Applicant: IPCom GmbH & Co. KG, Pullach (DE)

(72) Inventors: Maik Bienas, Schoeppenstedt (DE); Andreas Schmidt, Braunschweig (DE); Martin Hans, Bad Salzdetfurth (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

(21) Appl. No.: 16/652,517

(22) PCT Filed: Oct. 23, 2018

(86) PCT No.: PCT/EP2018/079004
§ 371 (c)(1),
(2) Date: Mar. 31, 2020

(87) PCT Pub. No.: WO2019/081489
PCT Pub. Date: May 2, 2019

(65) Prior Publication Data
US 2020/0287617 A1 Sep. 10, 2020

(30) Foreign Application Priority Data
Oct. 23, 2017 (EP) .................................... 17197768

(51) Int. Cl.
*H04B 7/185* (2006.01)
*H04B 15/00* (2006.01)
(52) U.S. Cl.
CPC ......... *H04B 7/18506* (2013.01); *H04B 15/00* (2013.01)

(58) Field of Classification Search
None
See application file for complete search history.

(56) References Cited

U.S. PATENT DOCUMENTS

| | | | |
|---|---|---|---|
| 5,699,069 | A | 12/1997 | Faulkner |
| 2007/0161347 | A1 | 7/2007 | Ma et al. |
| 2012/0015684 | A1 | 1/2012 | Noji |
| 2016/0105233 | A1 | 4/2016 | Jalali |
| 2017/0013476 | A1 | 1/2017 | Suthar et al. |

(Continued)

FOREIGN PATENT DOCUMENTS

| | | | |
|---|---|---|---|
| CN | 106464342 A | | 2/2017 |
| EP | 2994958 A1 | | 3/2016 |

(Continued)

OTHER PUBLICATIONS

Written Opinion of International Patent Application No. PCT/EP2018/079004, dated Jan. 18, 2019.

(Continued)

*Primary Examiner* — German Viana Di Prisco
(74) *Attorney, Agent, or Firm* — Marshall, Gerstein & Borun LLP

(57) ABSTRACT

The present invention provides a method of reducing interference caused by an aerial vehicle in a mobile communications system, the method comprising arranging for the aerial vehicle to steer radio transmissions when the aerial vehicle is airborne such that a direction of the transmissions is adjusted to be directed vertically downward.

11 Claims, 8 Drawing Sheets

(56) References Cited

U.S. PATENT DOCUMENTS

| | | | |
|---|---|---|---|
| 2017/0150373 A1* | 5/2017 | Brennan | H04W 16/28 |
| 2018/0277939 A1* | 9/2018 | Peitzer | H01Q 1/18 |
| 2018/0294871 A1* | 10/2018 | Kosseifi | B64C 39/024 |
| 2018/0352461 A1* | 12/2018 | Guirguis | H04B 17/336 |
| 2018/0359710 A1* | 12/2018 | Desclos | H04W 52/42 |
| 2020/0145125 A1* | 5/2020 | Wang | H04L 5/00 |

FOREIGN PATENT DOCUMENTS

| | | |
|---|---|---|
| JP | 2004229220 A | 8/2004 |
| WO | WO-2016028767 A1 | 2/2016 |

OTHER PUBLICATIONS

International Search Report of International Patent Application No. PCT/EP2018/079004, dated Jan. 18, 2019.

Sequans Communications: "Uplink Interference Mitigation for Aerial Vehicles", 3GPP Draft; R1-1718297, 3rd Generation Parnership Project, Mobile Competence Centre; vol. RAN WG1, Prague, CZ; Oct. 10, 2017-Oct. 13, 2017, XP051351676, URL:http://www.3gpp.org/ftp/tsg_ran/WG1_RL1/TSGR1_90b/Docs/ ,Sep. 29, 2017.

NTT Docomo et al.: "Initial views on potential problems and solutions for aerial vehicles", 3GPP Draft; R2-1704333_Initial Views On Potential Problems and Solutions for Aerial Vehicles, 3rd Generation Partnership Project, Mobile Competence Centre; F-06921, vol. RAN WG2, May 15, 2017-May 19, 2017, XP051274908, URL:http://www.3gpp.org/ftp/Meetings_3GPP_SYNC/RAN2/Docs/, dated May 14, 2017.

First Office Action, Chinese Patent Office issued in application No. CN201880069151.9, dated Aug. 4, 2021.

\* cited by examiner

REDUCTION OF INTERFERENCE CAUSED BY AERIAL VEHICLES

CROSS-REFERENCE TO RELATED APPLICATIONS

This is the United States National Phase of PCT/EP2018/079004, filed Oct. 23, 2018, which claims the priority benefit of European Patent Application No. 171 977 68.9, filed Oct. 23, 2017, the entire contents of each of which are hereby incorporated herein by reference.

FIELD OF THE DISCLOSURE

The present invention relates to techniques for reducing interference in a mobile communication system caused by aerial vehicles, in particular unmanned aerial vehicles, commonly referred to as "drones".

BACKGROUND

During 3GPP RAN Plenary #75 in March 2017 a new study item on "enhanced support for aerial vehicles" was discussed and approved for the RAN working groups. The motivation for bringing this study item to 3GPP is based on the growing number of drones (or, unmanned aerial vehicles, UAVs) that are equipped (or can be equipped) with mobile communication devices (user equipment, UE). The trend is caused by two types of drones, namely drones that allow people to attach ordinary cell phones to them, and commercially available drones that are equipped with embedded cellular modems.

Especially the use cases of drones for package delivery, search-and-rescue, monitoring of critical infrastructure, wildlife conservation, flying cameras, and surveillance are expected to grow rapidly. And similar use cases are likely to emerge in the coming years. Many of the before-mentioned use cases could benefit from connecting drones to cellular communication systems (e.g. to LTE networks) as a UE. This results in future situations where a large population of drones with cellular modems will be supplementing the legacy UEs population on (or, close to) the ground. Some mobile network operators therefore see a need to better prepare their current cellular communication networks for the upcoming data traffic growth caused by drones that are equipped with cellular modems.

For example, at low altitudes a drone equipped with a UE usually behaves like a conventional UE, but at higher altitudes the radio propagation characteristics change and a drone's uplink, UL, signal may turn out to be problematic, as it becomes more visible to multiple cells due to line-of-sight propagation conditions.

The UL signal transmitted from such a flying drone dramatically increases the interference on the UL signal received from neighbour cells, as depicted in FIG. 1. Thus, a drone's UL signal has a negative impact on other UEs residing/deployed on the ground (e.g. smartphone, IoT device, etc.).

The main difference of UL signals from flying drones to conventional zero-altitude UEs is that the radiation pattern is strongly different, and therefore a radiation pattern assumed during the network planning phase is incorrect. This is mainly due to the fact, that at higher positions, there are less attenuating obstacles between the (drone-) UE and the neighbouring cells. It may well be that a flying drone served by one cell interferes into a second or third next cell which was assumed not to be possible for zero-altitude UEs. In other words, the prediction of which cell is interfered by UEs served by other cells is quite different for flying UEs and zero-altitude UEs and as a result cell planning cannot be optimal and therefore Uplink connections will strongly suffer from UEs operating at high altitudes. These facts have been studied and are the reason for the referenced 3GPP documents, so the impacts described herein will be taken serious by network operators.

Furthermore, a drone's widely visible UL signal may also be problematic for sidelink (SL) communication (for instance, in the scope of D2D or V2V), as all PC5 (UE-to-UE interface) traffic is defined to take place on UL resources, i.e. on the same uplink carrier frequencies that are specified for uplink transmissions in case of LTE-FDD, and on the same uplink subframes that are specified for uplink transmissions in case of LTE-TDD. FIG. 2 shows the interference caused by a drone's UL signals on the SL channel established between two UEs involved in D2D (or V2V) operation in a neighbouring cell.

Currently, LTE base stations (eNB) have two measures to limit or avoid uplink interferences caused by UEs that are served by a neighbouring cell, an overload indicator, OI and a high interference indication, HII.

An eNB, that detects a high interference level on any uplink resource, may transmit an "overload indicator", OI to the neighbouring cells. The message includes an indication of the interfered radio resources. The neighbouring cells will than try to assign different resources to the UE which currently uses this resource.

An eNB that is about to assign uplink resources that will be transmitted with high power may transmit a high interference indication, HII, to the neighbouring cells with an ID of the affected radio resources. The receiving neighbouring cells will than try to avoid assignment of these resources.

A further measure to prevent interferences with state-of-the art methods is the application of beam forming methods, i.e. steering the transmit beam of the UE attached to a drone in direction towards the eNB of the serving cell. This is a more sophisticated method that will require a frequent adaption of the adaptive antennas as the beam direction must be adjusted permanently while the drone moves. In addition, a periodically exchange of control information between the UE and the eNB is required. The following definitions are used in the context of beam forming:

eNB-Tx-beam: An oriented downlink transmission configuration at the eNB used to transmit signals from tower to handset with improved antenna gain.
  eNB-Rx-beam: An oriented uplink reception configuration at the eNB used to receive signals transmitted from handset to tower with improved antenna gain.
  UE-Tx-beam: An oriented uplink transmission configuration at the UE used to transmit signals from handset to tower with improved antenna gain.
  UE-Rx-beam: An oriented downlink reception configuration at the UE used to receive signals transmitted from tower to handset with improved antenna gain.
  directed downlink: A downlink connection made up of a TRP-Tx-beam and UE-RX-beam.
  Directed Uplink: An uplink connection made up of a UE-TX-beam and a TRP-RX-beam.

From the patent literature, the adjusting of an antenna beam tilt (US 20120015684 A1) and beam width (JP 2004229220A) in a base station based on an altitude of either the base station's antenna itself or of a terminal (UE) are known. The adaption of the antenna is done to direct the antenna beam towards the UE and reduce interference to other devices or cells. The patent literature does not provide an adaption of a beam width autonomously in a UE, i.e. without dedicated signaling by a base station. Further, the estimated cell size is not considered for the beam width calculation. Also, the process of adjusting stepwise is unknown.

Further, from patent literature EP 2 994 958 A1 a method is known, where a beam width of a ground facing beam is dynamically adjusted based on the altitude of the flying vehicle (a balloon), that carries the communication device. Also for this patent, the estimated cell size of the serving cell is not considered for the beam width calculation.

US 2007/0161347 A1 describes an aircraft mounted mobile communication system acting as a repeater for UEs within the aircraft. An aerial is mounted on the belly of the aircraft to point vertically down in horizontal flight but the direction is not controllable relative to an orientation of the aircraft. No steering of radio transmissions is provided.

U.S. Pat. No. 5,699,069 also describes an aircraft mounted communication system. The system includes multiple antenna oriented in different directions to provide electromagnetic beams at different orientations in order to provide wide area coverage. There is no indication that the individual beams are steerable.

WO 2016/028767 A1 describes an airborne communication system having multiple airborne nodes for providing coverage to users on the ground. The airborne nodes are indicated to transmit vertically downwards but there is no indication that this is achieved by beam steering as opposed to a suitable orientation of a transmission antenna.

US 2017/0013476 A1 describes a drone carried radio acting as a mobile cell site. The drone has a directional antenna which may be oriented towards the ground but there is no indication that the radiation beam is steerable.

GENERAL DESCRIPTION

An aspect of this invention relates to a compensation of the effects caused by changing tilts of the drone during flight, which will affect the beam direction of directional antennas. The lateral position and/or the velocity of a drone may be controlled by maintaining and/or adjusting output to one or more propulsion units of the drone. The rotation speed of one or more rotors of the drone may affect the lateral movement of the drone. For example, the drone may be tilted in a particular direction to move in that direction and the speed of the rotors of the drone may affect the speed of the lateral movement and/or trajectory of movement. When the drone is tilted for a change of its lateral position and/or velocity, the antenna system of the UE attached to or embedded inside the drone is also tilted (in most cases) in such a way that the beam orientation it is no longer pointing straight (i.e. perpendicular) to the surface of the earth. Thus, another aspect of the present invention is a UE autonomous control function for the adjustment of its directed uplink beam orientation (i.e. the UE-Tx-beam) and/or directed downlink beam orientation (i.e. the UE-Rx-beam).

The currently available measures for interference cancellation OI and HII will fail to solve the issue with interferences caused by UEs operated in high altitudes, as it is likely, that the directly neighboured cells are not serving the interference causing UE. Instead the second or third (and so on) next cell may be serving this UE and therefore neither the OI nor the HII is received by the serving cell. An obvious extension to OI and HII to the next level of neighbouring cells will overly complicate the existing interference cancellation techniques.

Another reason for why OI and HII will fail, is the different power level of drone UEs compared zero-altitude UEs that will cause interferences. In some cases, the Drone-UE uses an uplink transmit power which is below the threshold to trigger transmission of HII. Therefore, HII is not send out but nevertheless the Drone-UE causes interferences. Then the OI may be used by the interfered eNB, but the interference might have already occurred and most likely data might have already been lost.

Due to the nature of drones, the cells that were affected by UL interferences and the UE affected by SL interferences will dynamically change. Therefore, there is a high amount of signalling required to transmit HHI and OI.

Beside this, issues in eliminating the UL interferences, HII and OI are not suitable for eliminating sidelink interference.

The use of beam forming techniques will reduce interferences, but at a high cost: The adjustment of the beam direction requires periodic control signalling between the drone-UE and the serving eNB. The adaption rate increases with increasing speed of the drone. It is therefore not suited in cases, where the drone moves fast and even in case of that the drone is not moving at all, there is a high amount of calculation and signalling required to maintain the correct beam direction.

The known solutions that uses a down-facing UE-tx-beam (e.g. in EP 2 994 958 A1), are not adapting the beam width according to the range of the serving cell. Therefore, the selected beam width is sub-optimal after a handover to a new serving cell. This will either lead to a higher interference power, if the beam width is too large, or to a bad connection quality, if the beam width is too low.

The present invention provides a method of reducing interference caused by an aerial vehicle in a mobile communications system, the method comprising arranging for the aerial vehicle to steer radio transmissions when the aerial vehicle is airborne such that a direction of the transmissions is adjusted to be directed vertically downward.

An autonomous arrangement which does not require signaling from a base station to control beam steering is advantageous.

A drone-attached UE is equipped with adaptive antennas, which are enabled to autonomously adapt the UE-Tx-beam (and/or the UE-Rx-beam) width and direction without control signalling towards the base station, whereas the beam direction is adjusted to facing perpendicular to the ground, irrespective of the drone's tilt by using a plummet function and the beam width is calculated based on the estimated range of the serving cell to lead to a coverage area on the ground that equals the range of the serving cell.

The benefit of the adaptive beamforming is, that interferences caused by UE operation in high altitudes are avoided as the received signal strength is reduced at the neighbouring cells. Therefore, the user and the network will benefit from a more reliable connection and a higher system throughput. Further the amount of signalling and the related effort to generate the messages for the network based interference cancellation methods OI and HII is significantly reduced and therefore calculation and communication resources are saved. In most cases, OI and HII are no longer required for the drone-UEs.

It is proposed to actively steer the beam in a vertical direction towards ground. This method is very simple to implement and it has no impact on the mobile network or eNBs. No signalling is required. Therefore, this method saves battery resources and radio resources.

The beam width may be controlled based on the measured altitude over ground and based on a footprint range (FPR), specific for the serving cell. The drone-UE's antenna system may be adjusted in such a way that the width of the transmit beam (and, if needed, also of the UE-Rx-beam) is reduced gradually the higher the drone flies. The aim here is to limit the footprint of the drone's UL beam on the ground. Likewise, when the drone's height above ground level is reduced, the drone's UL beam (and, if needed, also of the UE-Rx-beam) can be gradually enlarged again.

The altitude could be derived by the drone by different measures e.g.:
- based on analysis of images taken by a camera mounted to the drone, that will in most use cases anyway take a view from the drone and thus only some additional calculation is required to determine the height from the images.
- based on one or more sonar sensors as typically used by drones.
- based on signals or information from terrestrial communication systems, e.g. by measuring the angle of arrival of signals from transmitters (including cellular base stations like eNBs) with known locations.
- based on measured air pressure difference. Therefore, an air pressure sensor is attached to the drone, which measures the pressure at ground level (e.g. prior or at start of rotors) and periodically during flight. The altitude could be calculated by using the "barometric formula" assuming the pressure drops approximately by 11.3 Pa per meter in first 1000 meters above sea level.
- based on satellite based navigation systems like GPS, GLONASS, Galileo, or Beidou.

BRIEF DESCRIPTION OF THE DRAWINGS

Preferred embodiments of the invention will now be described, by way of example only, with reference to the accompanying drawing in which.

DETAILED DESCRIPTION

Figure 4:
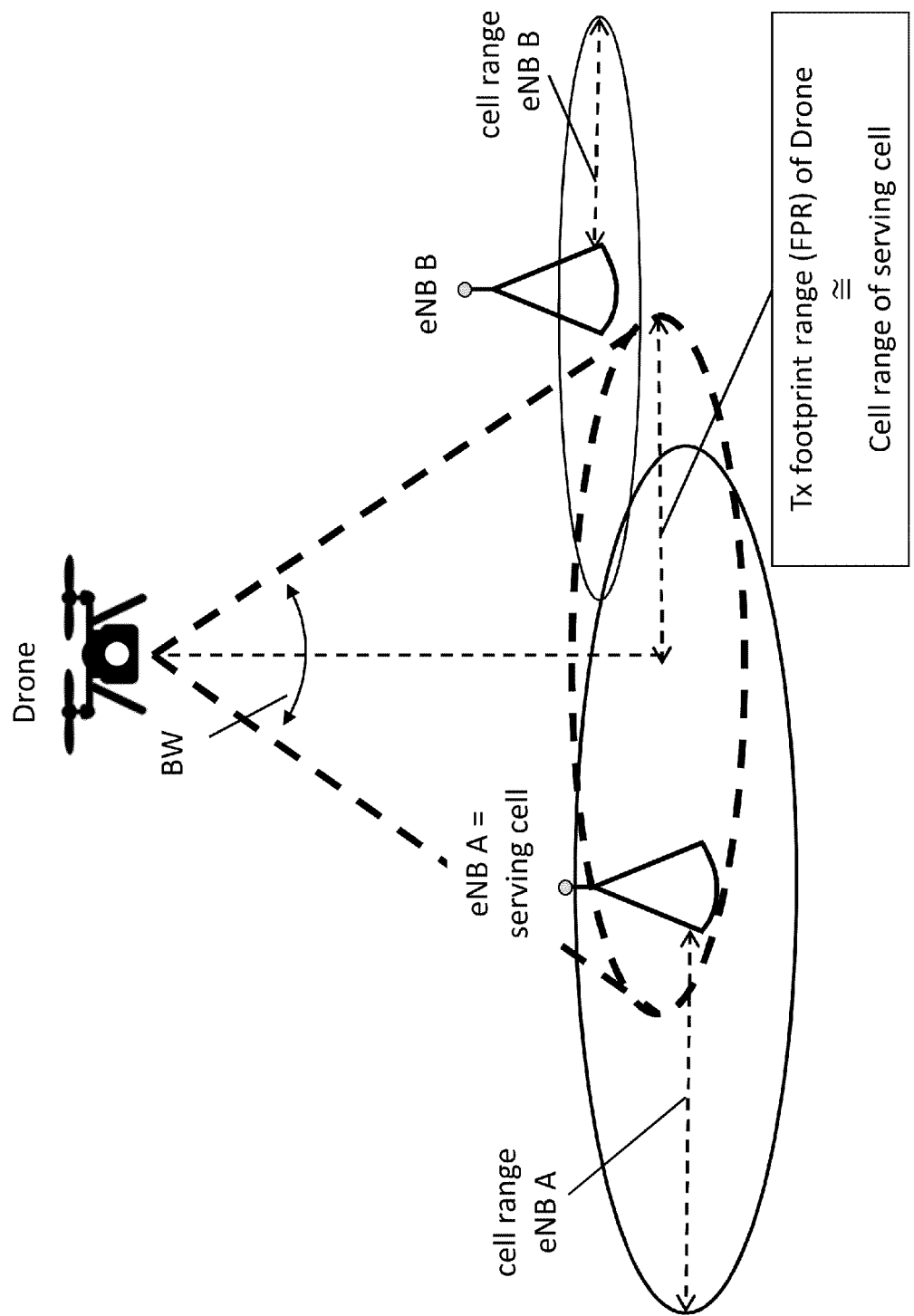
FIG. 4 illustrates controlling a drone footprint in accordance with a cell range.

In a first embodiment, a footprint range (FPR) is calculated by using an indication of the transmit range (=cell radius) of the serving cell as illustrated by FIG. 4. The beam width is then adjusted based on the drone's altitude to deliver a footprint range almost equal to the cell radius. E.g. in LTE, the cell radius could be estimated from the "reference signal power" ($P_{Ref}$). This parameter is the transmit power of the cell-specific downlink reference signals. It is broadcast by each cell in system information block (SIB) type 2 and the value range is from −60 dBm to +50 dBm. Equation (1) could be used to calculate the FPR value. It considers path loss calculations from a pathloss model such as that described at www.wirelesscommunication.nl/reference/chaptr03/pel/loss.htm:

$$FPR = \frac{1}{\sqrt{D_0 * f_c}} * 10^{\frac{P_{ref} - 24dBm + B_{DL}}{40}} * C_{DL} \quad (1)$$

where

FPR is the footprint range covered by the transmit beam of the drone-UE $D_0$ is a constant factor of 748 [1/m$^2$*MHz]

$P_{ref}$ is the reference signal power as broadcast by the eNB $f_c$ is the downlink carrier frequency in MHz as indicated by the eNB $B_{DL}$ is the downlink link budget for a transmit power of 24 dBm calculated according to a method described in an online LTE encyclopaedia at https://sites.google.com/site/lteencyclopedia/lte-radio-link-budgeting-and-rf-planning. Typically, not all required parameters for calculation of the link budget are known by the UE. In this case, the missing parameters are assumed to be the same as used in the example in the LTE encyclopaedia. If no parameter is known or if a rough estimation for the sake of simplicity is considered to be sufficient, the value 165.5 dBm could be used for $B_{DL}$ (c.f. Table 1)

$C_{DL}$ is a constant factor in the range of [0.1 to 10] used to adapt the FPR in relation to the cell range. The value "1" means, that the FPR equals the cell range. The value is either preconfigured in the UE or signalled by the mobile network to the UE.

Figure 5:
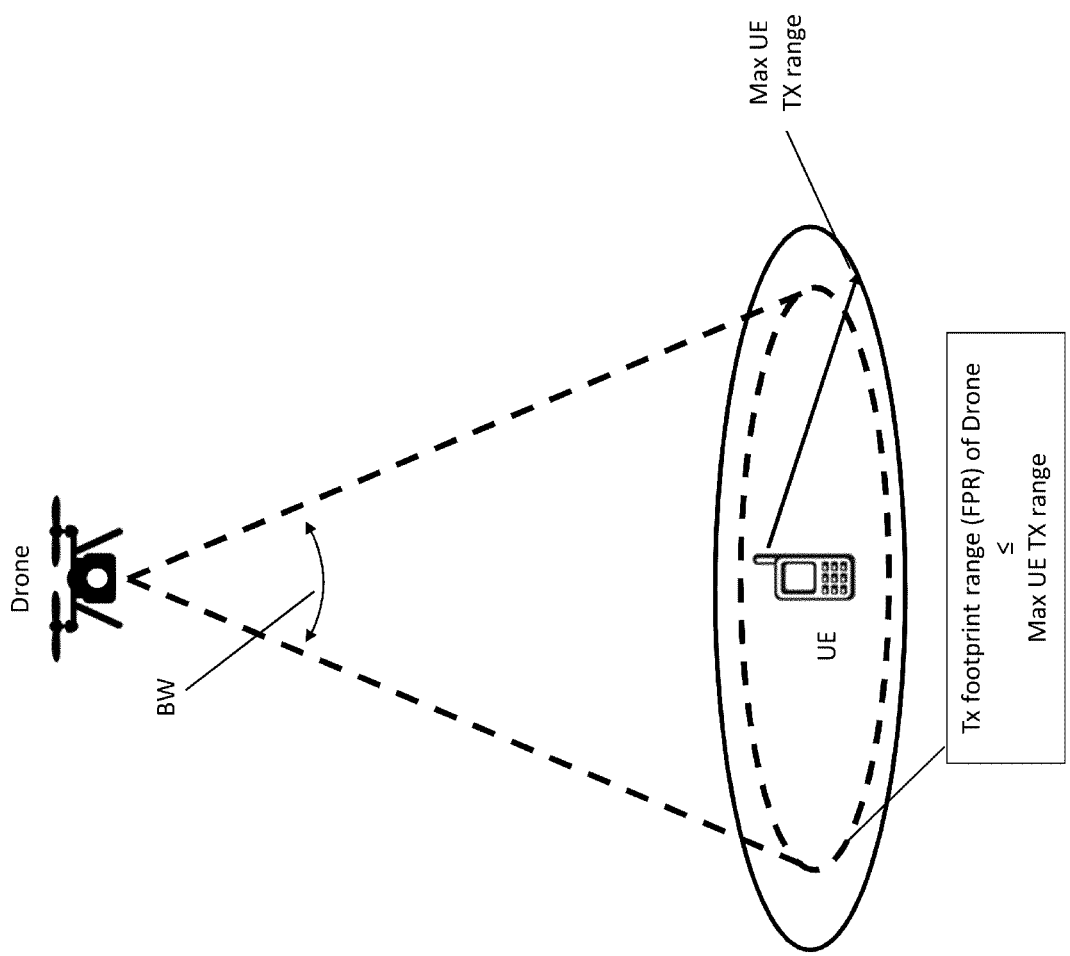
FIG. 5 illustrates controlling a drone footprint in accordance with a maximum transmission range.
Figure 6:
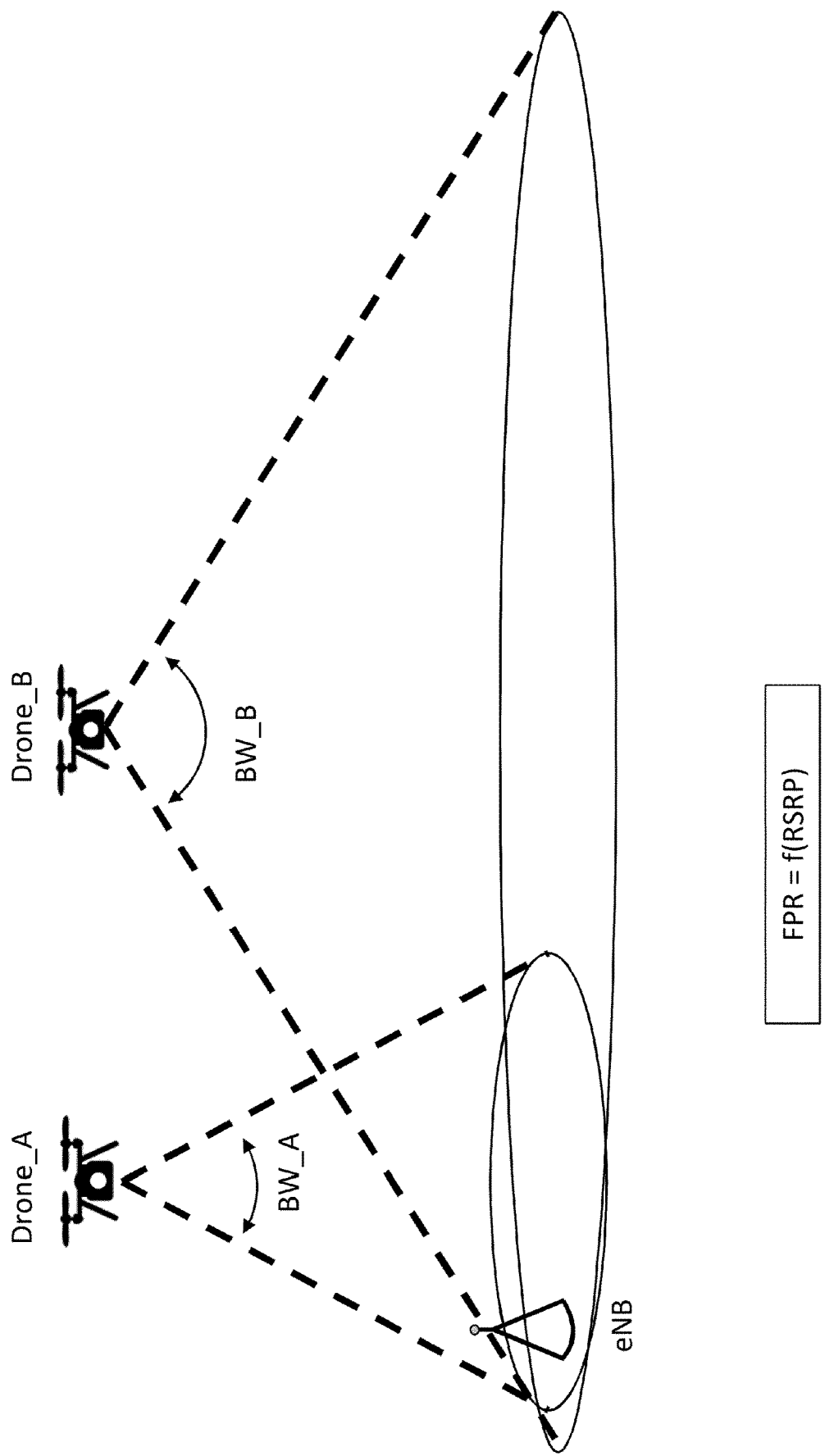
FIG. 6 illustrates varying a beam width according to a received signal power parameter.

In a second embodiment, the footprint range (FPR) of the drone is calculated to be smaller or equal to the maximum transmit range of zero-altitude UEs as illustrated by FIG. 5. The maximum transmit range of zero-altitude UEs for a given serving cell could be estimated e.g. in LTE from the parameter "$P_{MAX}$". This is the cell-specific maximum UE transmit power. It is broadcast by each cell in SIB1. Equation (2) could be used to calculate the FPR value. It considers path loss calculations from a path loss model such as that described at www.wirelesscommunication.nl/reference/chaptr03/pel/loss.htm.

$$FPR = \frac{1}{\sqrt{D_0 * f_c}} * 10^{\frac{P_{MAX} - 24dBm + B_{UL}}{40}} * C_{UL} \quad (2)$$

where

FPR is the footprint range covered by the transmit beam of the drone-UE $D_0$ is a constant factor of 748 [1/m$^2$*MHz]

$P_{MAX}$ is the maximum UE transmit power as broadcast by the eNB $f_c$ is the Uplink carrier frequency in MHz as indicated by the eNB $B_{UL}$ is the Uplink link budget for a transmit power of 24 dBm calculated in a manner described in the LTE encyclopaedia referred to above. Typically, not all required parameters for calculation of the link budget are known by the UE. In this case, the missing parameters are assumed to be the same as used in the example in the LTE encyclopaedia. If no parameter is known or if a rough estimation for the sake of simplicity is considered to be sufficient, the value 149.5 dBm could be used for $B_{UL}$. (c.f. Table 2. Instead of 64 kbps data rate 1 Mbps is used to obtain similar conditions as assumed for the downlink).

$C_{UL}$ is a constant factor in the range of [0.1 to 10] used to adapt the FPR in relation to the maximum transmit range of zero-altitude UEs. The value "1" means, that the FPR equals the transmit range of zero-altitude UEs. The value is either preconfigured in the UE or signalled by the mobile network to the UE.

Figure 1:
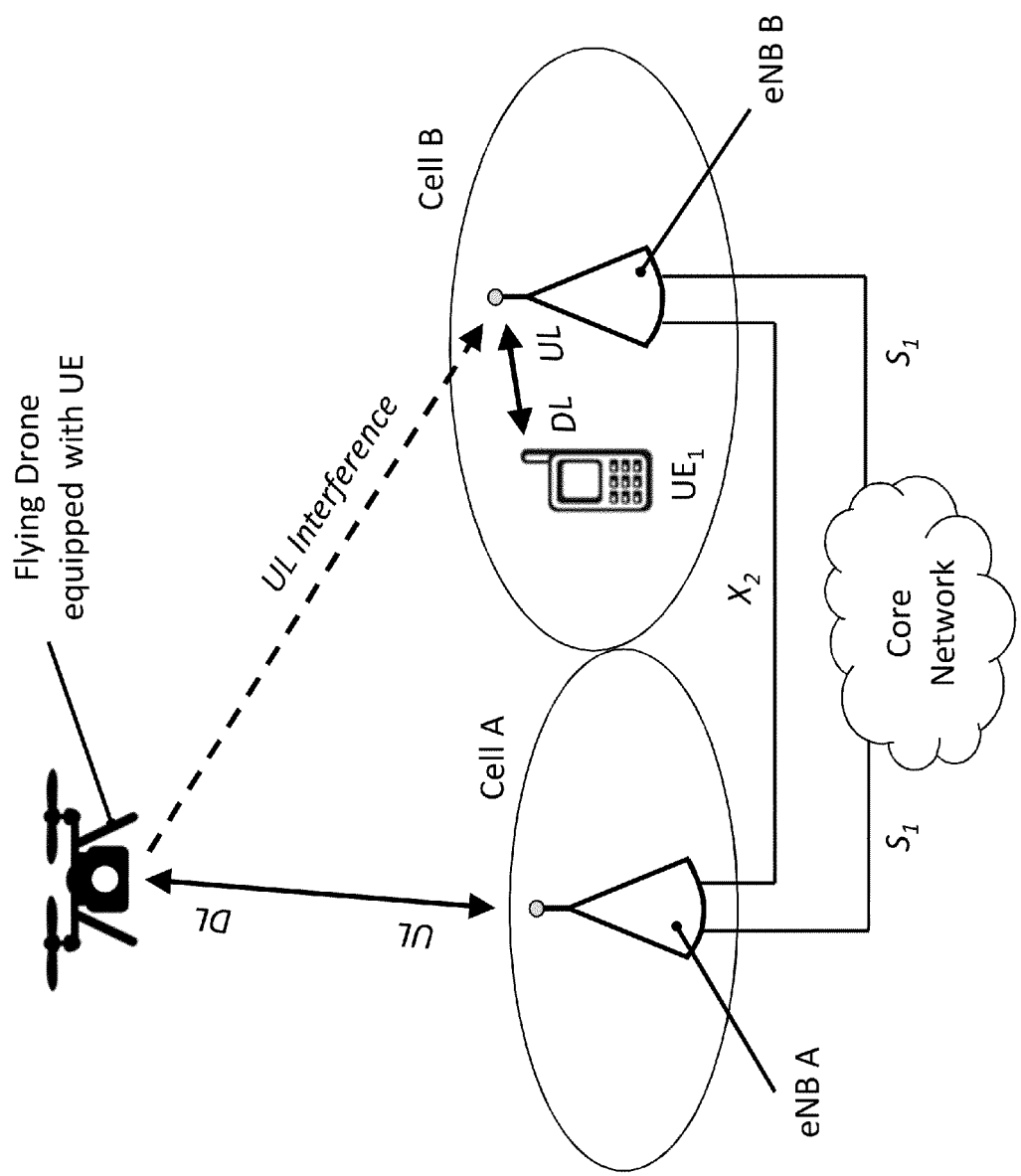
FIG. 1 illustrates a situation where a drone can cause interference in a neighbouring cell.
Figure 2:
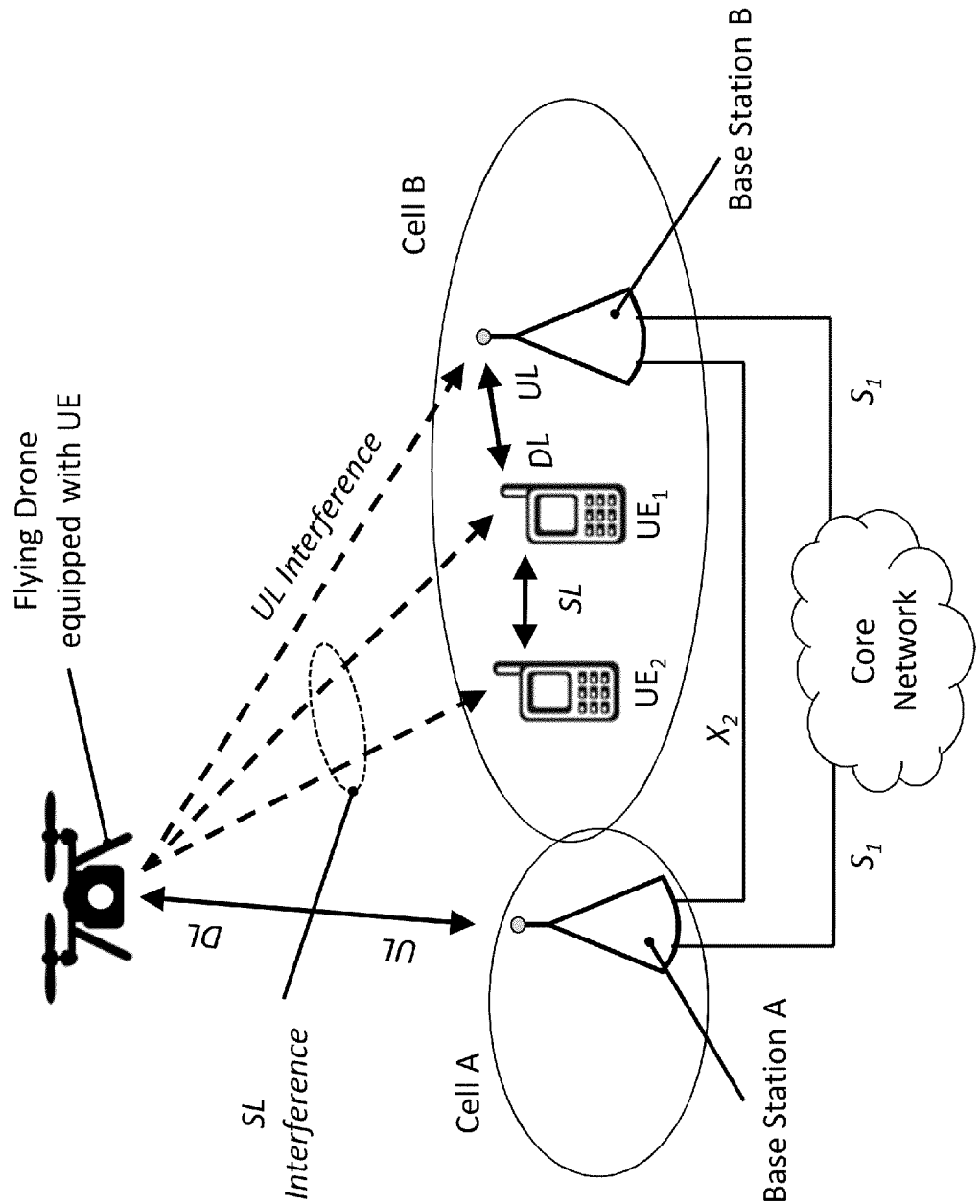
FIG. 2 illustrates a situation where a drone can cause sidelink interference for UEs operating in a neighbouring cell.
Figure 3:
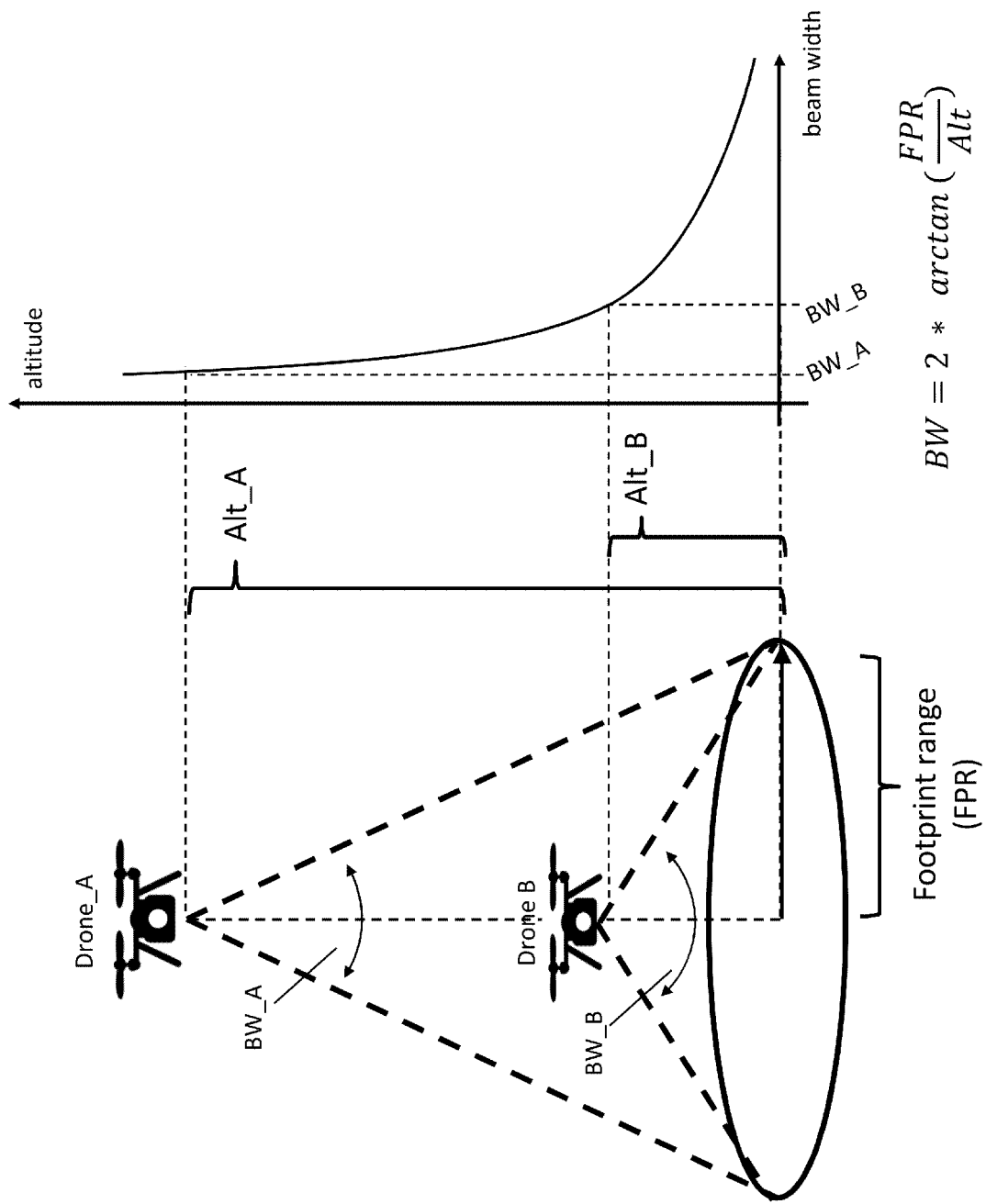
FIG. 3 illustrates varying a beam width with height.

In the first and second embodiments, the FPR is calculated individually for each cell. In a third embodiment, the FPR is a semi-static value, which is pre-known by the drone-UE and which may optionally be configurable by the network. The beam width (BW) could be calculated according to equation (3). The principle is depicted in FIG. 3.

$$BW = 2 * \arctan\left(\frac{FPR}{Alt}\right) \qquad (3)$$

It is typical for embodiments one to three, that only a slow adaption rate for the beam width of the adaptive antenna system is required, e.g. if the drone holds a certain altitude, only one beam width adaption after a handover to another cell may be required, if the new cell uses a different cell radius. Alternatively, no adaption is required until the drone left a certain altitude corridor. This is for the case where no cell-specific beam width adaption is used, or where the cell radius is the same for the new cell. The method is therefore best suited for drones that typically fly at certain altitudes, like delivery drones but also for all other kind of drones. The costs (e.g. battery consumption and processor resources) for the method are very low.

In a fourth embodiment, the beam width of the UE-Tx-beam is adjusted according to the received signal power from the serving or from neighbouring cells. Therefore, the drone-UE performs measurements of the received signal power from the selected base station. In case of an LTE base station (eNB), the RSRP value could be used (cf. 3GPP TS 36.214). In case that a neighbouring cell should be used, it selects the best neighbouring cell (e.g. the cell with the highest reference signal received power (RSRP)). For this measurement, the drone-UE uses a wide UE-Rx-beam width, that ensures that the measured cell is within this beam. Then the drone-UE repeats the measurement at the selected cell with reduced beam width. It makes further measurements with further reduced beam width, until the measured RSRP is about a certain offset smaller (e.g. 3 dB) compared to the initial measurement (which applies the wide beam). The UE-Rx-beam width of the latest measurement is than used for the UE-Tx-beam of the drone-UE provided the reception of the serving base station does not suffer (this can be ensured by performing these measurements very fast, e.g. within a few seconds). It will periodically proceed with the RSRP measurement and will adapt the beam width accordingly. In case that neighbour cell measurements are required, they will be performed by using a wide beam. Additionally, a fixed or configurable ratio R (e.g., in the range between 0.6 and 1.0) between the widths of UE-Tx-beam and UE-Rx-beam could be defined, for instance according to the formula (4).

$$R = \frac{BW_{UE\text{-}Tx\text{-}Beam}}{BW_{UE\text{-}Rx\text{-}Beam}} = 0.8 \qquad (4)$$

In a fifth embodiment, the beam width is controlled and adjusted as described in the foregoing embodiments. In addition, the beam is not directed vertically to the ground but it is directed towards the base station. This ensures the maximum beam antenna gain is used in communication with the base station which may reduce the necessary transmit power and thus decrease interference on other cells. The angle of deflection may be estimated from a measured angle of arrival or from geo location estimations of the UE relative to the base station.

Figure 8:
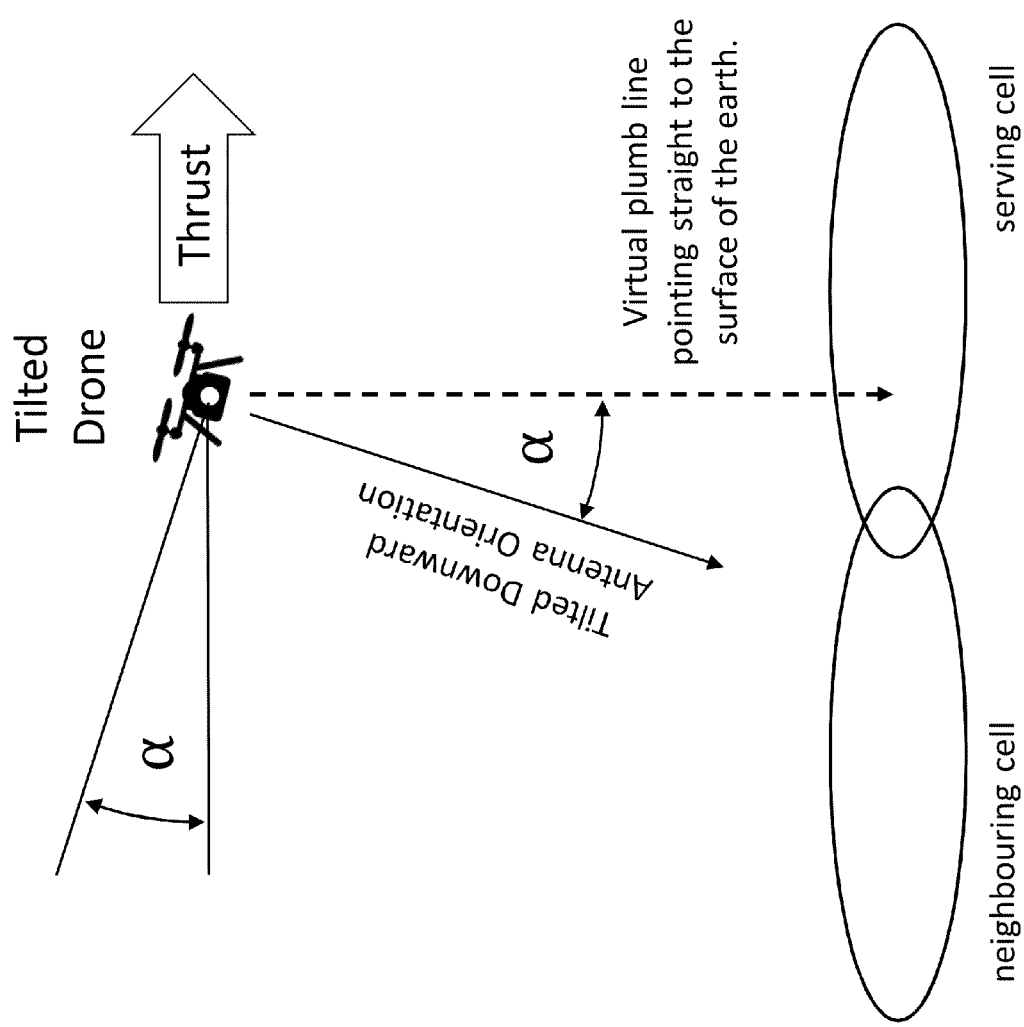
FIG. 8 illustrates varying a beam direction with drone attitude.

In one embodiment of the present invention the drone is equipped with means to autonomously keep the beam orientation during various flight manoeuvres vertically to the ground thereby compensating for tilt movements the drone might undergo in moments of acceleration or deceleration, or lateral movements in general. This function which we term a "plumb line" function used to derive the beam direction may be realized by means of inertial sensors, gyroscopes, magnetometers, or other types of sensors, so that the drones is enabled to keep an angle $\alpha$ between an orientation of the antenna system and the downward virtual plumb line as small as possible as illustrated by FIG. 8.

It is to be noted that the beam width described above is related to the antennas used for transmission, i.e. a UE-Tx-beam is generated. In most cases the same antenna characteristic can also be used for reception, i.e. the calculated parameters could be re-used to configure the antennas used in the receiver of the UE (UE-Rx-beam). This may be not useful in cases, where different base stations at different locations are used for uplink and downlink and in some cases, if the frequency offset between downlink and uplink is very large. Further, downlink measurements may lead to unexpected results, if a directed antenna characteristic is used. Therefore, an omni-polar characteristic is preferred for measurement purposes.

In the following example, it is assumed, that an LTE-based mobile network is serving the drone-UE. Nevertheless, the principles of the invention are also applicable if another type of mobile communication system is used, e.g. GSM, UMTS or any new type like 5G.

A drone is equipped with a UE, whereas the antennas are designed to send a directed beam downwards to the ground. The beam width is configurable between 10 and 180 degree and "omni-directional".

Figure 7:
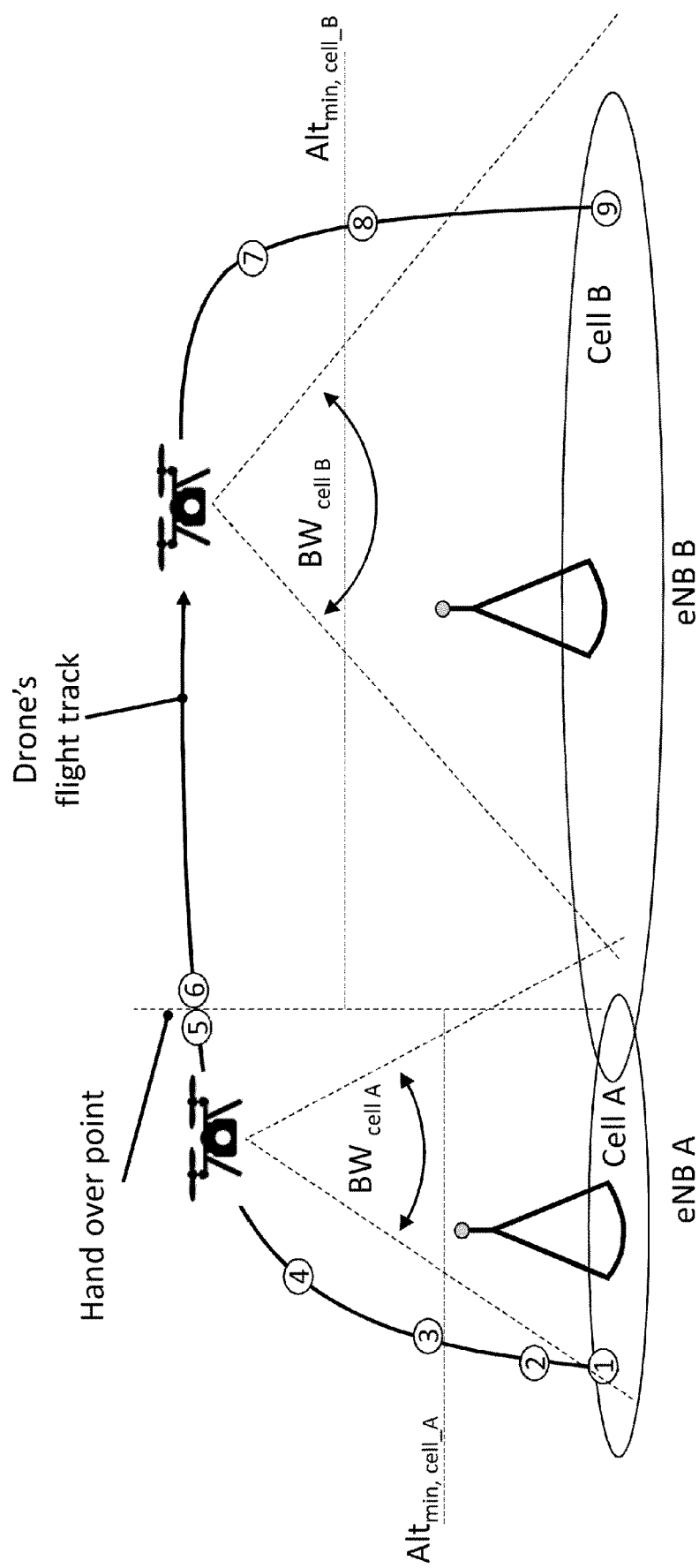
FIG. 7 illustrates steps performed according to a method of the invention.

A procedure to configure the beam width described below. The drone's flight track for this example is depicted in FIG. 7. The circled numbers in the figures corresponds to the numbering of the steps below.

1. The drone (incl. the drone-UE) is switched on. The drone-UE connects to the mobile network via eNB A. It obtains the reference signal power $P_{Ref}$ from eNB A and uses a omni-directional antenna characteristic for transmission and reception.

2. The drone lifts off. It starts monitoring the altitude (e.g. by using a sonar sensor). It was previously configured with an altitude threshold $Alt_{min}$ (either previously stored in the UE or, configured by the network). In this example $Alt_{min,\ cell\_A}=20$ m was signalled by the eNB A to the drone-UE. That means, in this example, each cell may choose to configure the drone-UE with a different value for the $Alt_{min}$ parameter. The drone-UE will use omni-directional antenna characteristic until this threshold is exceeded.

3. The drone further gains height. After detection that $Alt_{min}$ was exceeded, it starts to use the beam width control function, i.e. it calculates the value for FPR according to formula (1), which is valid for the current serving cell, i.e. no new calculation will be required until the next hand over.

Further it calculates the beam width "$BW_{cell\_A}$" with the current altitude and the FPR according to equation (3). This is done either periodically (e.g. once per second) or event driven if the difference of the current altitude to the altitude used for the previous calculation exceeds a certain value. The latter is most efficient if the drone holds a certain altitude.

4. During the flight, the drone-UE performs neighbour cell measurements as usual for a UE. Such measurements will be performed by using the omni-directional antenna characteristic.

5. At some point in time, these measurements indicate the need for a handover to cell B. Therefore, the drone-UE performs the handover to cell B as usual. And in addition, the drone-UE derives the values $P_{Ref}$ and $Alt_{min,cell\_B}$ from eNB B.

6. The drone-UE applies the newly received parameter $P_{Ref}$ to calculate FPR and the beam width "$BW_{cell\_B}$". In the example in FIG. 7, $P_{Ref}$ of cell B and therefore the cell range is much larger than $P_{Ref}$ of cell A. Therefore, the FPR will be much larger after the handover.

7. The drone comes closer to the landing area and starts to decrease altitude.

8. The drone-UE detects, that the current altitude falls below $Alt_{min,cell\_B}$. Therefore, it stops using the beam width control function. It will use now an omni-directional antenna characteristic 9. The drone has landed and is switched off.

TABLE 1

| | Data rate (Mbps) | 1 |
|---|---|---|
| | Transmitter - eNode B | |
| a | HS-DSCH power (dBm) | 46.0 |
| b | TX antenna gain (dBi) | 18.0 |
| c | Cable loss (dB) | 2.0 |
| d | EIRP (dBm) | 62.0 = a + b + c |
| | Receiver - UE | |
| e | UE noise figure (dB) | 7.0 |
| f | Thermal noise (dBm) | −104.5 = k(Boltzmann) * T(290K) * B(360 kHz) |
| g | Receiver noise floor (dBm) | −97.5 = e + f |
| h | SINR (dB) | −10.0 From Simulations performed |
| i | Receiver sensitivity (dBm) | −107.5 = g + h |
| j | Interference Margin (dB) | 3.0 |
| k | Control Channel Overhead (dB) | 1.0 |
| l | RX antenna gain (dBi) | 0.0 |
| m | Body Loss (dB) | 0.0 |
| | Maximum path loss | 165.5 = d − i − j − k + l − m |

Downlink link budget (="Maximum path loss") for 1 Mbps with dual-antenna receiver terminal (from "LTE encyclopaedia").

TABLE 2

| | Data rate (kbps) | 64 |
|---|---|---|
| | Transmitter - UE | |
| a | Max. TX power (dBm) | 24.0 |
| b | TX antenna gain (dBi) | 0.0 |
| c | Body loss (dB) | 0.0 |
| d | EIRP (dBm) | 24.0 = a + b + c |
| | Receiver - eNode B | |
| e | Node B noise figure (dB) | 2.0 |
| f | Thermal noise (dBm) | −118.4 = k(Boltzmann) * T(290K) * B(360 kHz) |

TABLE 2-continued

| | Data rate (kbps) | 64 |
|---|---|---|
| g | Receiver noise floor (dBm) | −116.4 = e + f |
| h | SINR (dB) | −7.0 From Simulations performed |
| i | Receiver sensitivity (dBm) | −123.4 = g + h |
| j | Interference Margin (dB) | 2.0 |
| k | Cable Loss (dB) | 2.0 |
| l | RX antenna gain (dBi) | 18.0 |
| m | MHA gain (dB) | 2.0 |
| | Maximum path loss | 163.4 = d − i − j − k + l − m |

Uplink link budget (="Maximum path loss") for 64 kbps with dual-antenna receiver base station (from "LTE encyclopaedia").

The invention claimed is:

1. A method of reducing interference caused by an aerial vehicle in a mobile communications system, the method comprising:
arranging for the aerial vehicle to steer radio transmissions when the aerial vehicle is airborne to compensate for a tilt of the aerial vehicle such that a direction of the radio transmissions is adjusted to be directed vertically downward and wherein the aerial vehicle adapts a beam width of the radio transmissions such that a footprint of the beam on the ground is controlled in relation to a determined cell size of a base station communicating with the aerial vehicle, the determined cell size of the base station being determined by the aerial vehicle from a reference signal power value parameter broadcast by the base station.

2. The method according to claim 1, wherein the beam width is adapted using a measure of an altitude of the aerial vehicle above ground and a function of the determined cell size.

3. The method according to claim 1, wherein the aerial vehicle controls a beam width of the radio transmissions such that a footprint of the beam on the ground is controlled in relation to an estimated transmission range of user equipment operating at ground level.

4. The method according to claim 3, wherein a received maximum transmit power parameter is used to determine a value for the estimated transmission range.

5. The method according to claim 1, wherein the aerial vehicle controls a beam width of the radio transmissions such that a footprint of the beam on the ground is controlled in relation to a predetermined value.

6. The method according to claim 1, wherein the aerial vehicle controls a beam width of the radio transmissions such that a footprint of the beam on the ground is controlled in relation to a received signal power from a selected base station of the mobile communications system.

7. The method according to claim 6, wherein the aerial vehicle performs measurements of received signal power from the selected base station with a varying selected receive beam width until the received signal power is below a predetermined threshold and a value of a receive beam width generating the received signal power below the predetermined threshold is used as the beam width for the radio transmissions from the aerial vehicle.

8. The method according to claim 1, wherein a measure of an altitude of the aerial vehicle above the ground is used to control the beam width.

9. The method according to claim 1, wherein a measurement of aerial vehicle flight attitude is used to control a steering of the direction of the radio transmissions.

10. The method according to claim 1, wherein the radio transmissions are steered once the aerial vehicle exceeds a predetermined height above the ground.

11. An aerial vehicle including a user equipment module adapted to perform the method of claim 1.

\* \* \* \* \*